(12) United States Patent
Yu et al.

(10) Patent No.: US 8,265,337 B2
(45) Date of Patent: Sep. 11, 2012

(54) APPARATUS AND METHOD FOR REAL-TIME CAMERA TRACKING

(75) Inventors: Jung-Jae Yu, Daejeon (KR); Jae-Hean Kim, Daejeon (KR); Hye-mi Kim, Daejeon (KR); Il-Kwon Jeong, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 706 days.

(21) Appl. No.: 12/489,970

(22) Filed: Jun. 23, 2009

(65) Prior Publication Data

US 2010/0158352 A1    Jun. 24, 2010

(30) Foreign Application Priority Data

Dec. 22, 2008   (KR) .................. 10-2008-0131662

(51) Int. Cl.
*G06K 9/00* (2006.01)
(52) U.S. Cl. .................. 382/103; 382/190; 348/169
(58) Field of Classification Search .................. 382/103, 382/190; 348/169
See application file for complete search history.

(56) References Cited

U.S. PATENT DOCUMENTS

| | | | |
|---|---|---|---|
| 5,850,469 A | 12/1998 | Martin et al. | 382/154 |
| 6,710,844 B2 | 3/2004 | Han et al. | 352/44 |
| 7,062,071 B2* | 6/2006 | Tsujino et al. | 382/103 |
| 7,447,337 B2 | 11/2008 | Zhang et al. | 382/107 |
| 2005/0008256 A1 | 1/2005 | Uchiyama et al. | 382/291 |
| 2007/0098303 A1* | 5/2007 | Gallagher et al. | 382/305 |

FOREIGN PATENT DOCUMENTS

| | | |
|---|---|---|
| JP | 2005-33319 | 2/2005 |
| JP | 2005-69757 | 3/2005 |
| JP | 2007-333679 | 12/2007 |
| KR | 10-0453222 | 10/2004 |
| KR | 10-2007-0068408 | 6/2007 |

OTHER PUBLICATIONS

Rahardja et al., "Vision-Based Bin-Picking: Recognition and Localization of Multiple Complex Objects Using Simple Visual Cues", 1996, IEEE, Proc. IROS 96, 1448-1457.*
Andrew J. Daviso et al., "MonoSLAM:Real-Time Single Camera SLAM", IEEE Transactions on Pattern Analysis and Machine Intelligence, vol. 29 No. 6, pp. 1052-1067, Jun. 2007.
Laura A. Clemente et al., "Mapping Large Loops with a Single Hand-Held Camera", Proceeding, Robotics: Science and systems, Jul. 30, 2007.

* cited by examiner

*Primary Examiner* — Jason M Repko
*Assistant Examiner* — Katrina Fujita
(74) *Attorney, Agent, or Firm* — Staas & Halsey LLP

(57) ABSTRACT

A camera tracking apparatus for calculating in real time feature information and camera motion information based on an input image includes a global camera tracking unit for computing a global feature map having feature information on entire feature points; a local camera tracking unit for computing in real time a local feature map having feature information on a part of the entire feature points; a global feature map update unit for receiving the computed feature information from the global and local camera tracking units to update the global feature map; and a local feature selection unit for receiving the updated feature information from the global feature map update unit to select in real time the feature points contained in the local feature map. The local camera tracking unit computes the local feature map for each frame, while the global camera tracking unit computes the global feature map over frames.

18 Claims, 4 Drawing Sheets

APPARATUS AND METHOD FOR REAL-TIME CAMERA TRACKING

CROSS-REFERENCE(S) TO RELATED APPLICATION(S)

The present invention claims priority of Korean Patent Application No. 10-2008-0131662, filed on Dec. 22, 2008, which is incorporated herein by reference.

FIELD OF THE INVENTION

The present invention relates to an apparatus and method for real-time camera tracking; and, more particularly, to an apparatus and method for estimating location and rotation of a camera moving in a wide area by using an input image in real time.

BACKGROUND OF THE INVENTION

Camera tracking is a technology for analyzing an input image of a camera to estimate state variables of the camera at the time of imaging. According to application fields, state variables of a camera may only include motion variables, e.g., movement and rotation of the camera, or, may further include internal variables, e.g., a focal length, a principal point and an aspect ratio. The estimated state variables are loaded into software, e.g., Maya and Max, and then, a user can image a CG (Computer Graphics) object by moving a virtual camera according to the state variables to synthesize the CG object with an actual imaged background. Such a method is widely used in producing movies and commercial films.

Real-time camera tracking, i.e., camera tracking performed simultaneously with imaging, is widely used in, e.g., unmanned robot driving, augmented reality applications and real-time synthesis preview. In the real-time camera tracking, the number of features of state vectors increases as an area within which a camera moves widens. Further, the sizes of a feature map and the state vectors increase as time goes.

Researches have been carried out to achieve stability and accuracy of the real-time camera tracking. However, conventional real-time camera tracking still has a drawback in that a wide moving area of a camera results in memory lack and decrease in computation speed.

SUMMARY OF THE INVENTION

In view of the above, the present invention provides an apparatus and method for real-time camera tracking, which can perform real-time camera tracking on a camera moving in a wide area while preventing memory lack and decrease in computation speed caused by increase in the number of features.

In accordance with an aspect of the present invention, there is provided a camera tracking apparatus for calculating in real time feature information and camera motion information based on an input image, the apparatus including:

a global camera tracking unit for computing a global feature map having feature information on entire feature points;

a local camera tracking unit for computing in real time a local feature map having feature information on a part of the entire feature points;

a global feature map update unit for receiving the computed feature information from the global and local camera tracking units to update the global feature map; and a local feature selection unit for receiving the updated feature information from the global feature map update unit to select in real time the feature points contained in the local feature map.

Preferably, the local camera tracking unit computes the local feature map for each frame, and the global camera tracking unit computes the global feature map over frames.

Preferably, the local feature selection unit selects the feature points contained in the local feature map based on a current camera angle.

Preferably, the local feature selection unit selects, as the feature points contained in the local feature map, feature points within or adjacent to the current camera angle.

Preferably, a specific number of the feature points adjacent to each other forms a feature group; and the local feature selection unit selects, as the feature points contained in the local feature map, feature points in feature groups within or adjacent to the current camera angle.

Preferably, the local feature selection unit selects, as the feature points contained in the local feature map, feature points in each feature group having a centroid within or adjacent to the current camera angle.

Preferably, the global feature map has the feature information having been contained in the local feature map in past or being contained in the local feature map currently.

Preferably, the feature information and camera motion information contained in the global feature map are represented as a single state vector.

Preferably, the feature information includes pixel coordinates in the image and depth information in an axial direction of a camera.

Preferably, the state vector is obtained via estimation using a uniform motion model and feature tracking using active feature measurement.

In accordance with another aspect of the present invention, there is provided a camera tracking method for calculating in real time feature information and camera motion information based on an input image, the method including:

computing a global feature map having feature information on entire feature points;

computing in real time a local feature map having feature information on a part of the entire feature points;

updating the global feature map by using the computation result for the global and local feature maps; and selecting in real time the feature points contained in the local feature map by using the updated feature information.

Preferably, the local feature map is computed for each frame, and the global feature map is computed over frames.

Preferably, the feature points contained in the local feature map are selected based on a current camera angle.

Preferably, feature points within or adjacent to the current camera angle are selected as the feature points contained in the local feature map.

Preferably, a specific number of the feature points adjacent to each other forms a feature group; and feature points in feature groups within or adjacent to the current camera angle are selected as the feature points contained in the local feature map.

Preferably, feature points in each feature group having a centroid within or adjacent to the current camera angle are selected as the feature points contained in the local feature map.

Preferably, the global feature map has the feature information having been contained in the local feature map in past or being contained in the local feature map currently.

Preferably, the feature information and camera motion information contained in the global feature map are represented as a single state vector.

Preferably, the feature information includes pixel coordinates in the image and depth information in an axial direction of a camera.

Preferably, the state vector is obtained via estimation using a uniform motion model and feature tracking using active feature measurement.

According to the present invention, even if a camera moves in a wide area, memory lack and decrease in computation speed caused by increase in the number of features can be prevented, thereby ensuring stable real-time camera tracking performance.

Brief Description of the Drawings

The above features of the present invention will become apparent from the following description of embodiments, given in conjunction with the accompanying drawings, in which.

DETAILED DESCRIPTION OF THE EMBODIMENT

Hereinafter, embodiments of the present invention will be described in detail with reference to the accompanying drawings, which form a part hereof.

Below, camera tracking denotes a procedure to estimate motion variables of a camera and locations of feature points in a three-dimensional space. Further, a feature map may include location information of specific feature points in the three-dimensional space and covariance matrixes of the specific feature points showing uncertainty of the location information.

Figure 1:
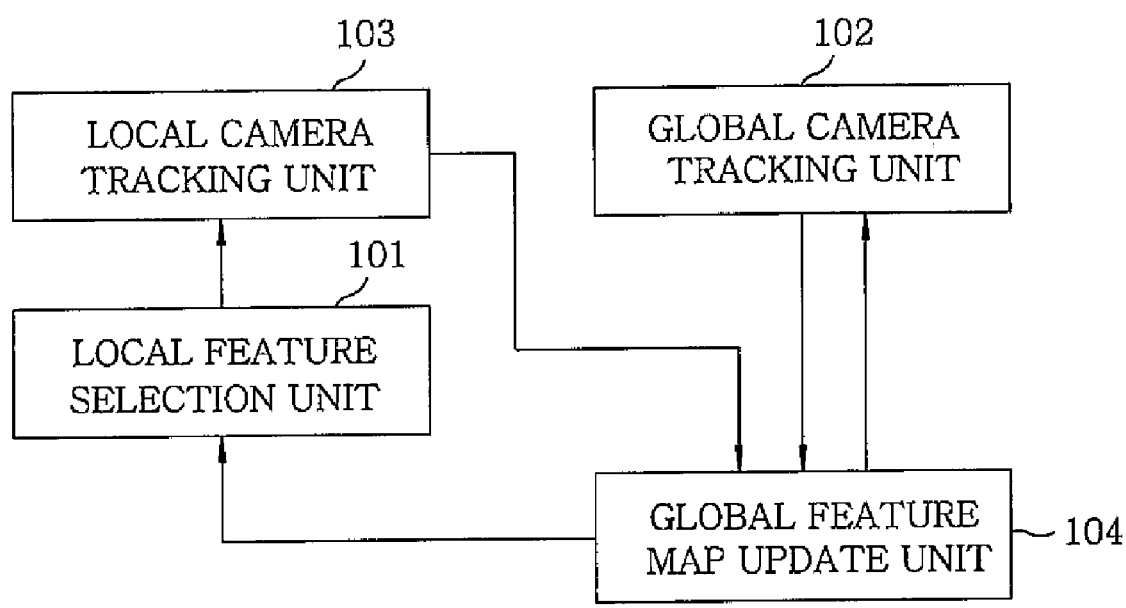
FIG. 1 illustrates a real-time camera tracking apparatus in accordance with an embodiment of the present invention.

FIG. 1 illustrates a real-time camera tracking apparatus in accordance with an embodiment of the present invention.

The real-time camera tracking apparatus of the present invention calculates based on an input image feature information and camera pose information in real time. The real-time camera tracking apparatus includes a global camera tracking unit 102 for computing in non-real time a global feature map having feature information on all feature points; a local camera tracking unit 103 for computing in real time a local feature map having feature information on a part of the feature points; a global feature map update unit 104 for receiving the feature information from the global camera tracking unit 102 and the local camera tracking unit 103 to update the global feature map; and a local feature selection unit 101 for selecting, among feature information in the global feature map updated the global feature map update unit 104, feature information belonging to the local feature map in real time.

The local camera tracking unit 103 performs camera tracking operation on the local feature map for each frame, while the global camera tracking unit 102 performs camera tracking operation on the global feature map over several frames. The camera tracking operations of the local camera tracking unit 103 and the global camera tracking unit 102 are performed in parallel in a multi-core CPU (Central Processing Unit) environment via a multi-thread scheme. The feature information computed by the local camera tracking unit 103 and the global camera tracking unit 102 is reflected to the global feature map by the global feature map update unit 104, and thus the feature information is updated. A specific number of adjacent extracted feature points form a feature group in an extraction order, and all the extracted feature points are stored in the global feature map update unit 104 in forms of feature groups.

The local feature selection unit 101 selects, for each frame, feature points or feature groups to be processed by the local camera tracking unit 103. The selection procedure is carried out by selecting a feature group within a camera angle estimated according to location and rotation information of the camera at a previous frame and feature groups adjacent to the selected feature group.

Figure 2:
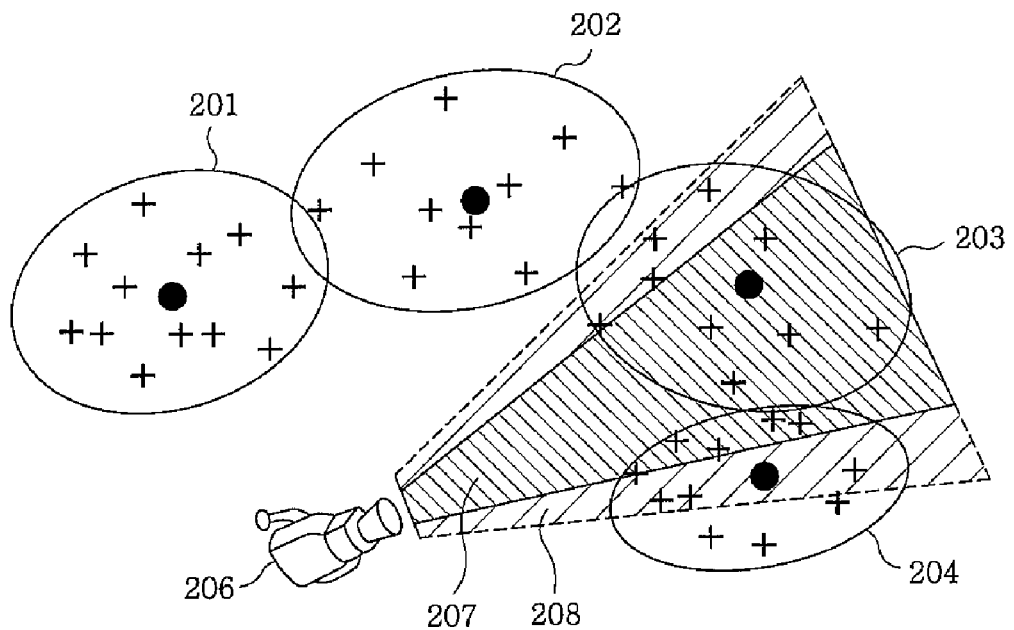
FIG. 2 illustrates an explanatory view of a local feature selection procedure performed in the local feature selection unit of FIG. 1.

FIG. 2 illustrates an explanatory view of a local feature selection procedure performed in the local feature selection unit 101 of FIG. 1.

In FIG. 2, a camera 206 is imaging while moving. Reference numerals 201 to 204 indicating ellipses denote feature groups formed in the extraction order and stored in the global feature map update unit 104. Crosses in the feature groups 201 to 204 denote location of feature points, and circles at the center of the feature groups 201 to 204 denote representative feature points representing feature points belonging to the corresponding feature groups. Each representative feature point may be the centroid of a corresponding feature group, i.e., mean location of all feature points belonging to the corresponding feature group. Reference numeral 207 indicating a trapezoid denotes a current camera angle of the camera 206, and reference numeral 208 indicating another trapezoid denotes an extended camera angle of the camera 206.

Basically, the local feature selection unit 101 selects, as a processing object, feature points belonging to feature groups whose centroids become to be within the current camera angle 207. In FIG. 2, all feature points in the feature group 203 are selected.

However, if only feature groups whose centroids become to be within a current camera angle are selected, some feature points belonging to the feature group 204 cannot be processed by the local camera tracking unit 103 even though they are within the current camera angle 207, as shown in FIG. 2. In order to improve system performance, it is preferable to process all feature points within the current camera angle. Therefore, feature groups whose centroids become to be within the extended camera angle 208 can be selected in the feature selection procedure. According to such feature selection procedure, since the centroid of the feature group 204 is not within the current camera angle 207 but within the extended camera angle 208, all feature points belonging to the feature group 204 can be processed by the local camera tracking unit 103.

The local feature selection unit 101 obtains a state vector X formed with location information of thus selected feature points and camera motion information computed at the previous frame, and provides the state vector X to the local camera tracking unit 103. The state vector X is as in Equation 1:

$$X = \begin{pmatrix} x_v \\ y_1 \\ y_2 \\ \vdots \end{pmatrix}, X_v = \begin{pmatrix} r^W \\ q^{WR} \\ v^W \\ \omega^R \end{pmatrix}, \quad \text{Equation 1}$$

wherein a vector $X_v$ corresponds to the camera motion information including location and rotation information of a camera. A vector $y_i$ corresponds to location information of an $i_{th}$ feature point selected by the local feature selection unit 101, which includes a pixel coordinate of the feature point at its first appearing frame. Vectors r, q, v and w correspond to movement, rotation, line velocity and angular velocity of the camera, respectively. Further, suffixes W, WR and R represent conversion in world coordinates, rotational conversion of corresponding frame coordinates into world coordinates and rotational conversion with respect to the current camera axis respectively.

The local camera tracking unit 103 performs extended Kalman filtering on the state vector X provided by the local feature selection unit 101, and provides the result to the global feature map update unit 104. The above-described procedure is carried out for each frame.

The global camera tracking unit 102 receives as an input a state vector including accumulated feature information and recently estimated location and rotation information of the camera, and also performs extended Kalman filtering identical to that in the local camera tracking unit 103. The global camera tracking may be performed over frames as the size of the global feature map in the global feature map update unit 104 increases, whereas the local camera tracking and the local feature selection are carried out for each frame. Whenever the global camera tracking is performed, the result is reflected to the global feature map.

Figure 3:
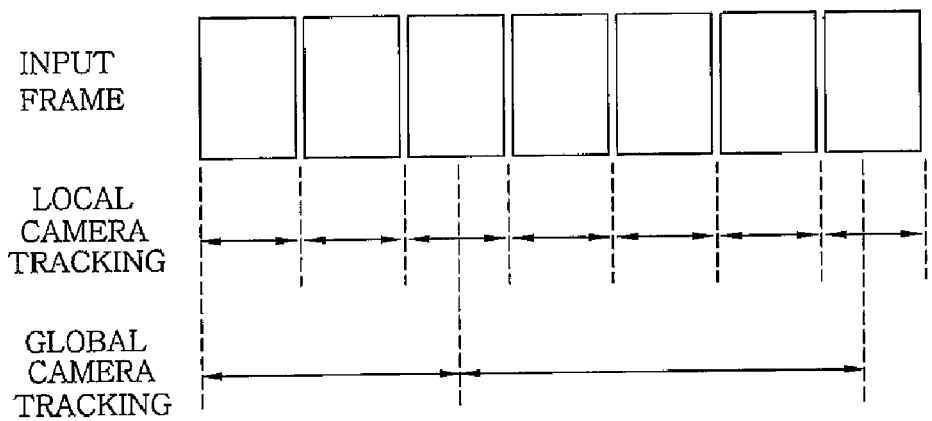
FIG. 3 illustrates a parallel processing of global camera tracking and local camera tracking.

FIG. 3 illustrates a parallel processing of the global camera tracking and local camera tracking.

As described above, the local camera tracking unit 103 performs the local camera tracking operation for each frame, while the global camera tracking unit 102 performs the global camera tracking operation over frames according to the size of the state vector. The global camera tracking unit 102 and the local camera tracking unit 103 retrieve necessary feature information from the global feature map update unit 104 at the time when they are called, and the camera tracking results are reflected to the global feature map at the time when the camera tracking operations are completed.

Figure 4:
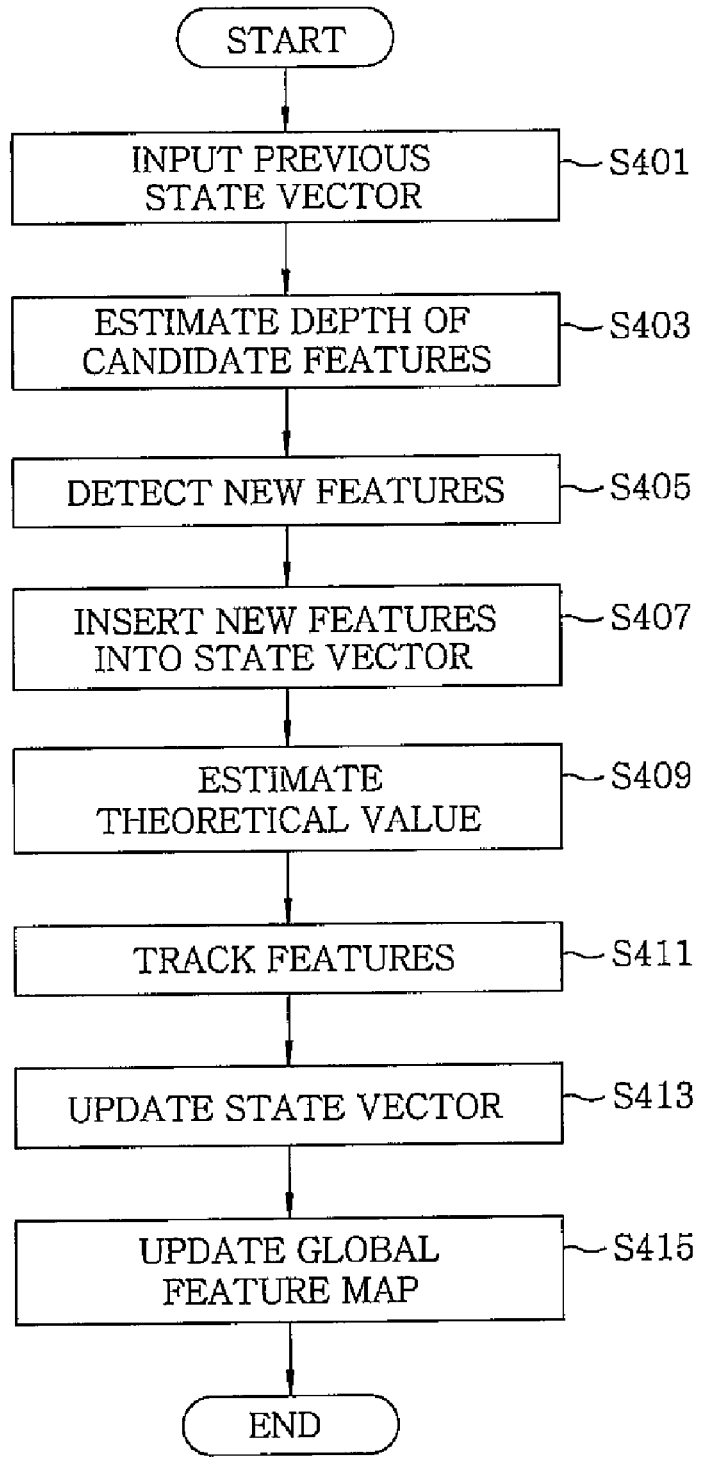
FIG. 4 illustrates a local camera tracking operation performed by the local camera tracking unit of FIG. 1.

FIG. 4 illustrates the local camera tracking operation performed by the local camera tracking unit 103 of FIG. 1.

First, the state vector X as in Equation 1 is provided from the local feature selection unit 101 (step S401). The state vector X includes the location information of the feature points selected by the local feature selection unit 101 and the camera motion information computed at the previous frame, as described above.

Particle filtering is performed on candidate feature points to estimate depth information thereof (step S403). The candidate feature points refer to feature points detected at a previous frame but depth information thereof has not yet converged sufficiently.

New Feature points are detected in a current frame (step S405). Feature points in a current state vector and the candidate feature points are excluded from detection objects in the step S405.

Candidate feature points whose depth information estimated in the step S403 has converged within a specific range are inserted into the state vector X (step S407). Meanwhile, candidate feature points having depth information having not yet converged still remain as the candidate feature points, and will be subjected to the procedure of the step S403 again in a next frame.

A theoretical value of the state vector X is estimated by using a uniform motion model (step S409), and feature tracking using AFM (Active Feature Measurement) is performed on feature points in the state vector X to obtain an observation value of the state vector X (step S411).

A Kalman gain is calculated based on a process model, and the state vector X is updated by using the theoretical value of the state vector X, the observation value of the state vector X and the Kalman gain, as in Equation 2 (step S413):

$$x(t|t) = \Phi(t)x(t|t-1) + K(t)(y(t) - h(x(t|t-1))), \quad \text{Equation 2}$$

wherein $\Phi(t)$, $K(t)$ and $x(t|t-1)$ denote a prediction matrix, a Kalman gain and a state vector calculated at a previous frame, respectively. $y(t)$ denotes location of features tracked using the AFM from the previous frame to a current frame, and serves as the observation value in the Kalman filtering. Further, $h(x(t|t-1))$ denotes location of features estimated at the current frame according to a state vector predicted by using the prediction matrix, and serves as the theoretical value in the Kalman filtering.

The state vector, i.e., feature information, updated in the step S413 is provided to the global feature map update unit 104, thereby being reflected to the global feature map (step S415).

Figure 5:
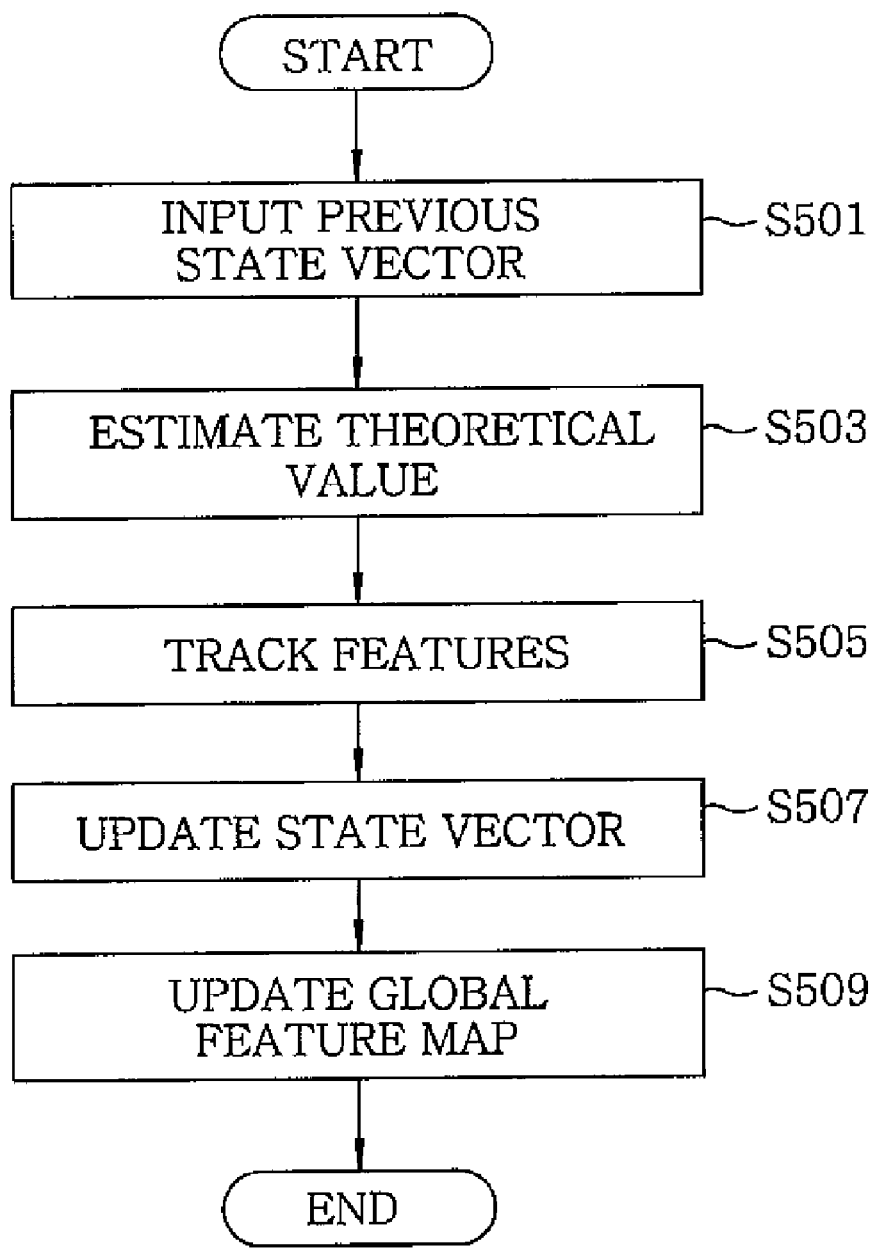
FIG. 5 illustrates a global camera tracking operation performed by the global camera tracking unit of FIG. 1.

FIG. 5 illustrates a global camera tracking operation performed by the global camera tracking unit 102 of FIG. 1.

The global camera tracking operation is similar to the local camera tracking operation, except that elements of an input state vector is different from those in the local camera tracking operation.

A state vector having, as elements thereof, all feature information stored in the global feature map update unit 104 is provided to the global camera tracking unit 102 (step S501). That is, unlike in the local camera tracking operation, selection of features to be provided to the global camera tracking unit 102 is not performed. The state vector provided to the global camera tracking unit 102 also has, as camera motion information, location and rotation information of a camera calculated by the local camera tracking unit 103 at recent frames.

Thereafter, a theoretical value of the state vector is estimated by using a uniform motion model (step S503), feature tracking is performed on feature points to obtain an observation value of the state vector (step S505) and the state vector is updated (step S507). The state vector, i.e., feature information, updated in the step S507 is provided to the global feature map update unit 104, thereby being reflected to the global feature map (step S509). The steps S503 to S509 are identical to the steps S409 to S415 in the local camera tracking operation.

While the invention has been shown and described with respect to the embodiments, it will be understood by those skilled in the art that various changes and modification may be made without departing from the scope of the invention as defined in the following claims.

What is claimed is:

1. A camera tracking apparatus for calculating in real time feature information and camera motion information based on an input image, the apparatus comprising:

a global camera tracking unit for computing a global feature map having feature information on entire feature points;

a local camera tracking unit for computing in real time a local feature map having feature information on a part of the entire feature points;

a global feature map update unit for receiving the computed feature information from the global and local camera tracking units to update the global feature map; and a local feature selection unit for receiving the updated feature information from the global feature map update unit to select in real time the feature points contained in the local feature map;

wherein the local feature selection unit selects the feature points contained in the local feature map based on a current camera angle.

2. The apparatus of claim 1, wherein the local camera tracking unit computes the local feature map for each frame, and wherein the global camera tracking unit computes the global feature map over frames.

3. The apparatus of claim 1, wherein the local feature selection unit selects, as the feature points contained in the local feature map, feature points within or adjacent to the current camera angle.

4. The apparatus of claim 1, wherein a specific number of the feature points adjacent to each other forms a feature group; and wherein the local feature selection unit selects, as the feature points contained in the local feature map, feature points in feature groups within or adjacent to the current camera angle.

5. The apparatus of claim 4, wherein the local feature selection unit selects, as the feature points contained in the local feature map, feature points in each feature group having a centroid within or adjacent to the current camera angle.

6. The apparatus of claim 1, wherein the global feature map has the feature information having been contained in the local feature map in past or being contained in the local feature map currently.

7. The apparatus of claim 6, wherein the feature information and camera motion information contained in the global feature map are represented as a single state vector.

8. The apparatus of claim 7, wherein the feature information includes pixel coordinates in the image and depth information in an axial direction of a camera.

9. The apparatus of claim 7, wherein the state vector is obtained via estimation using a uniform motion model and feature tracking using active feature measurement.

10. A camera tracking method for calculating in real time feature information and camera motion information based on an input image, the method comprising:

computing a global feature map having feature information on entire feature points;

computing in real time a local feature map having feature information on a part of the entire feature points;

updating the global feature map by using the computation result for the global and local feature maps; and selecting in real time the feature points contained in the local feature map by using the updated feature information;

wherein the feature points contained in the local feature map are selected based on a current camera angle.

11. The method of claim 10, wherein the local feature map is computed for each frame, and wherein the global feature map is computed over frames.

12. The method of claim 10, wherein feature points within or adjacent to the current camera angle are selected as the feature points contained in the local feature map.

13. The method of claim 10, wherein a specific number of the feature points adjacent to each other forms a feature group; and wherein feature points in feature groups within or adjacent to the current camera angle are selected as the feature points contained in the local feature map.

14. The method of claim 13, wherein feature points in each feature group having a centroid within or adjacent to the current camera angle are selected as the feature points contained in the local feature map.

15. The method of claim 10, wherein the global feature map has the feature information having been contained in the local feature map in past or being contained in the local feature map currently.

16. The method of claim 15, wherein the feature information and camera motion information contained in the global feature map are represented as a single state vector.

17. The method of claim 16, wherein the feature information includes pixel coordinates in the image and depth information in an axial direction of a camera.

18. The method of claim 16, wherein the state vector is obtained via estimation using a uniform motion model and feature tracking using active feature measurement.

* * * * *